Aug. 4, 1959           A. C. PARK           2,897,607
SIMULATED ORBITING ARTIFICIAL SATELLITE
Filed April 3, 1958           5 Sheets-Sheet 1
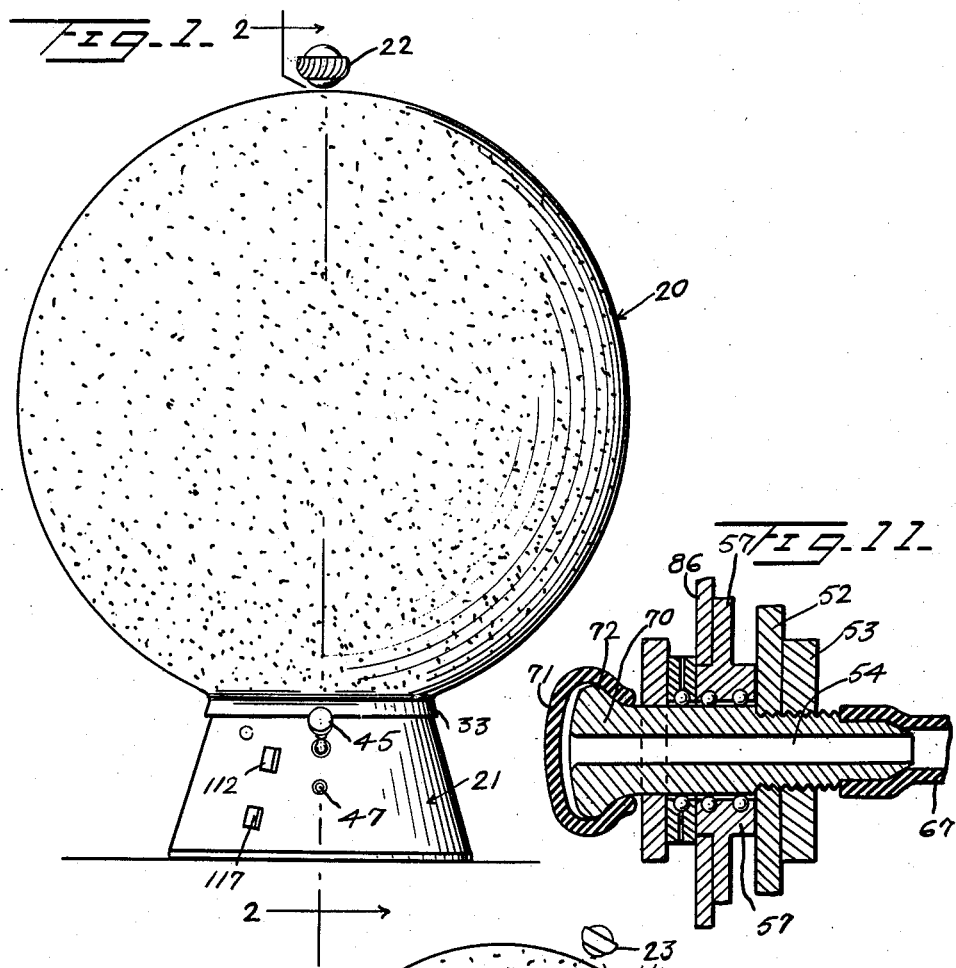
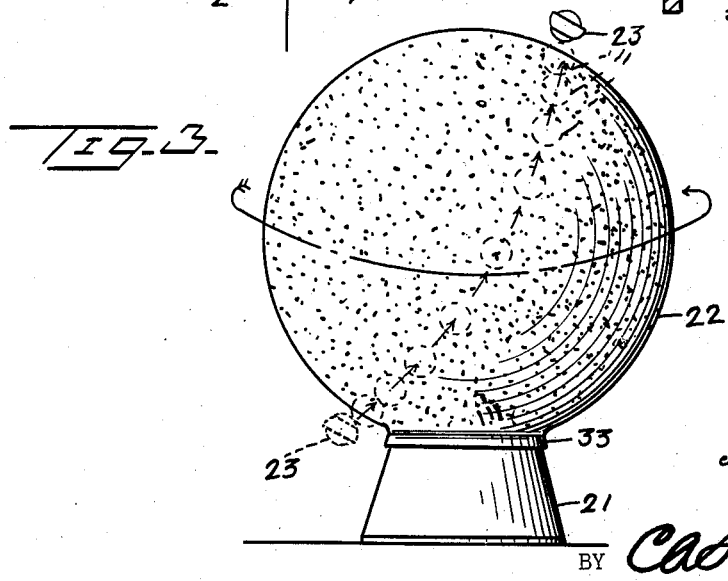
A. C. Park
INVENTOR
BY
ATTORNEYS.

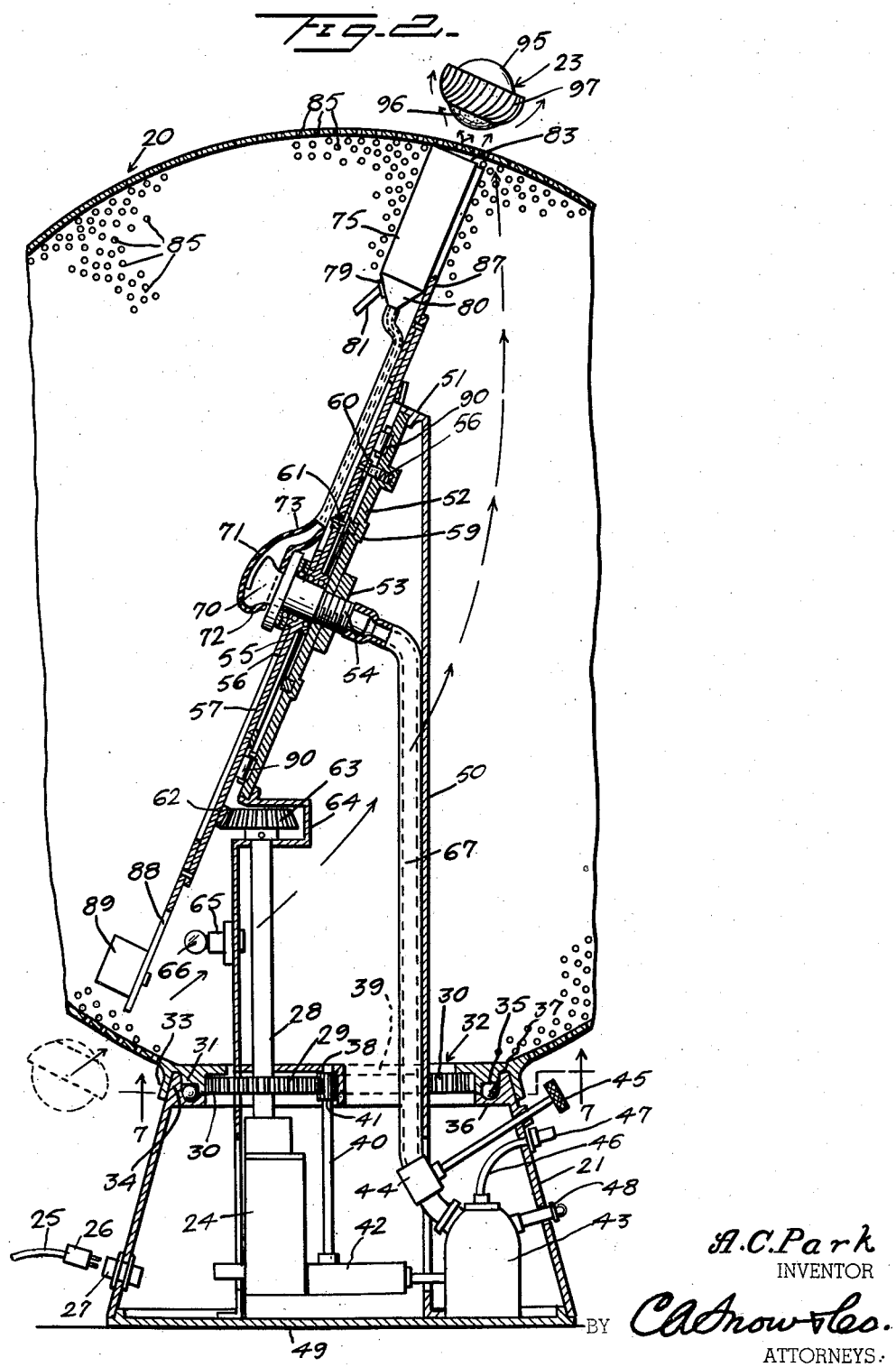

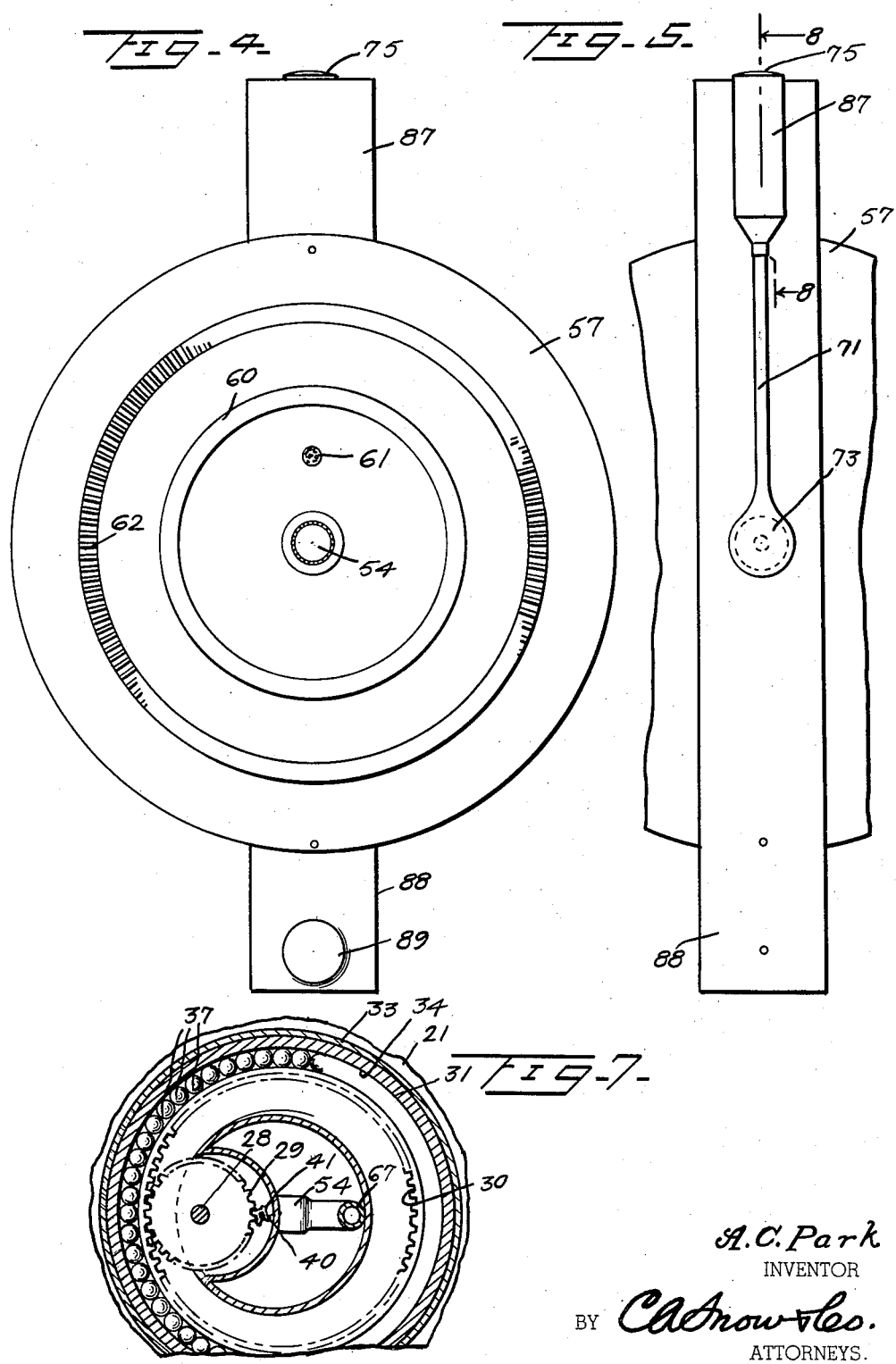

Aug. 4, 1959 A. C. PARK 2,897,607
SIMULATED ORBITING ARTIFICIAL SATELLITE
Filed April 3, 1958 5 Sheets-Sheet 4
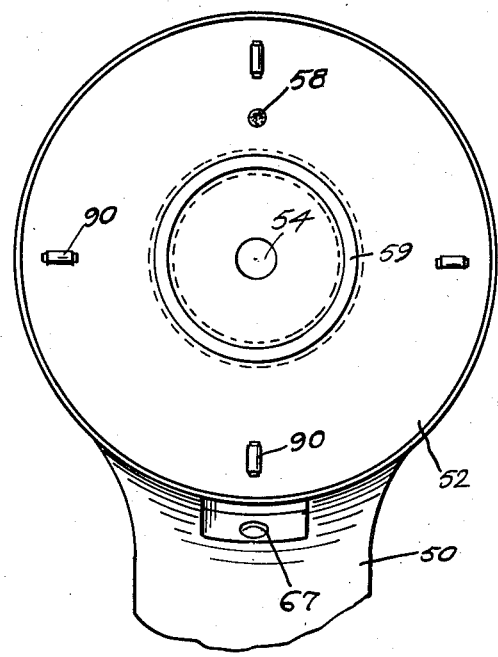
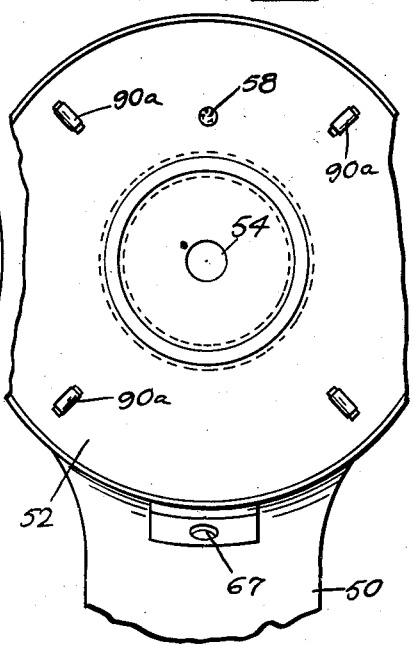
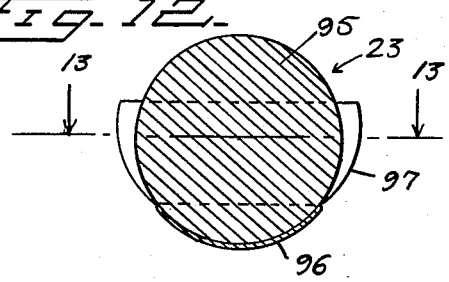
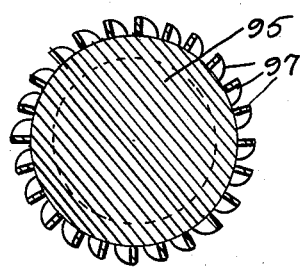
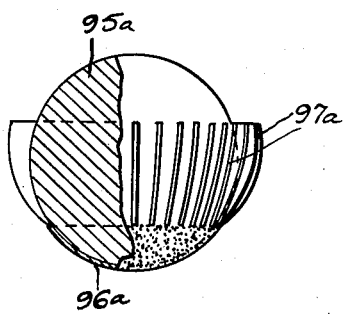
A.C. Park
INVENTOR
BY C.A. Snow & Co.
ATTORNEYS.

Aug. 4, 1959 — A. C. PARK — 2,897,607
SIMULATED ORBITING ARTIFICIAL SATELLITE
Filed April 3, 1958 — 5 Sheets-Sheet 5
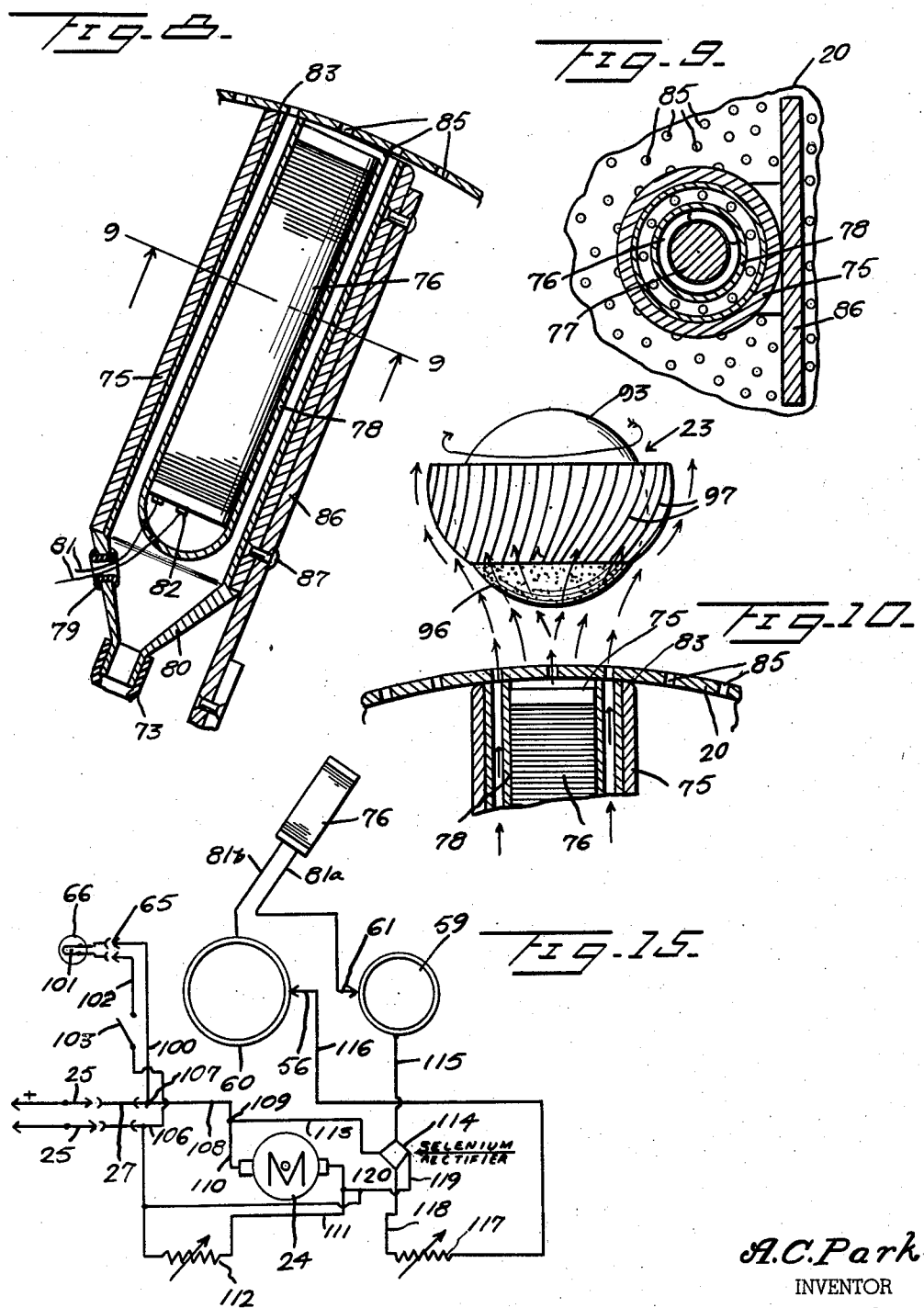
A.C. Park
INVENTOR
BY C.A. Snow & Co.
ATTORNEYS.

United States Patent Office 2,897,607
Patented Aug. 4, 1959

2,897,607

SIMULATED ORBITING ARTIFICIAL SATELLITE

Alexander C. Park, Sacramento, Calif.

Application April 3, 1958, Serial No. 726,079

6 Claims. (Cl. 35—46)

This invention relates to a simulated orbiting artificial satellite, and has as its primary object the provision of an educational or entertainment device in simulation of an artificial satellite orbiting about a replica of the earth, means being provided to simulate the earth's axial rotation.

An additional object of the invention is the provision of means whereby the satellite is placed and maintained in an orbit about the simulated replica of earth.

An additional object of the invention is the provision of means whereby a predetermined orbit may be selected, and the satellite artificially suspended, by means of the attraction of an electro magnetic device and the balanced repulsion of the current of air as directed to the adjacent surface of the simulated satellite.

A further object of the invention is the provision of means whereby the ratio of the rotation of the satellite and the rotation of the simulated earth may be synchronized in such manner that the satellite continuously rotates in a fixed orbit, the position of the orbit as to longitude varying in accordance with the rotative position of the simulated earth.

An additional object of the invention is the provision of means whereby the speed of rotation of the satellite may be varied.

Still another object of the invention is the provision of a device of this character whereby the position and distance of the satellite remains constant regardless of the rotative position of the simulated earth.

A further object of the invention is the provision of such a device which has a relatively high educational value, in depicting the relative position of an orbiting satellite relative to the surface of the earth, and which also has a high entertainment value in the simulated plotting of the rotation of such an orbiting satellite.

Still other objects reside in the combinations of elements, arrangement of parts, and features of construction, all as will be more fully pointed out hereinafter and disclosed in the accompanying drawings.

Still other objects will in part be obvious and in part be pointed out hereinafter.

In the drawings:

Figure 1 is a side elevational view of a simulated replica of the earth mounted on a base, showing the orbiting satellite and its relation thereto.

Figure 2 is an enlarged sectional view taken substantially along the line 2—2 of Figure 1 as viewed in the direction indicated by the arrows, parts thereof being broken away.

Figure 3 is a diagrammatic view indicating the path or rotation of the simulated earth, and the various positional locations of the satellite orbiting thereabout.

Figure 4 is an enlarged rear plan view of the rotating disk carrying the satellite orbiting solenoid.

Figure 5 is a fragmentary front elevational view of the construction shown in Figure 4.

Figure 6 is a plan view of the supporting arm for the rotating disk, the disk being removed.

Figure 6a is a view similar to Figure 6 but showing a modified arrangement.

Figure 7 is a fragmentary sectional view taken substantially along the line 7—7 of Figure 2 as viewed in the direction indicated by the arrows.

Figure 8 is an enlarged sectional view taken through the satellite's supporting solenoid and its associated casing.

Figure 9 is a fragmentary sectional view taken substantially along the line 9—9 of Figure 8 as viewed in the direction indicated by the arrows.

Figure 10 is a fragmentary view partially in elevation and partially in section diagrammatically illustrating the satellite, its associated solenoid, and the air flow adapted to support the satellite in spaced relation from the surface of the globe.

Figure 11 is an enlarged fragmentary sectional view showing the connection of the rotating disk and the fixed supporting arm therefor and indicating the means for permitting the continuous free flow of air.

Figure 12 is an enlarged fragmentary sectional view taken longitudinally through one form of the simulated satellite.

Figure 13 is a sectional view taken substantially along the line 13—13 of Figure 12 as viewed in the direction indicated by the arrows.

Figure 14 is a view partially in elevation and partially in section disclosing a modified form of simulated satellite and, Figure 15 is a diagrammatic wiring view of the apparatus.

Similar reference characters refer to similar parts throughout the several views of the drawings.

Having reference now to the drawings in detail, there is generally indicated at 20 a globe, which is preferably comprised of translucent material, and which may contain thereon a representation of a map of the world in the conventional manner. The globe is mounted for rotation on a frusto conical base generally indicated at 21, and is adapted to be revolved in a manner to be more fully described hereinafter.

A simulated artifical satellite generally indicated at 22 is adapted to revolve in an orbit about the globe, also in a manner to be more fully described hereinafter.

Interiorly of the base, which is frusto conical in configuration as above stated, there is provided an electric motor 24, which is adapted to be supplied with current from a cord 25 and plug 26 adapted to be connected to an electrical outlet, the plug 26 engaging in a female socket 27, positioned in a wall of the base. The motor is mounted vertically, and has extending therefrom a drive shaft 28, which extends upwardly into the globe 20. A driving gear 29 surrounds the shaft 28, and is adapted to engage a ring gear 30 carried interiorly by a depending internal flange 31 of the base generally indicated at 32 of the globe 20. An external flange 33 confronts the internal flange 31, and the flanges are adapted to be positioned on opposite sides of a circular flange 34 forming the uppermost portion of the base 21.

The inner flange 31 is provided with a shoulder 35, which forms the upper side of the ball race, the lower portion of which is indicated at 36, and is integral with the flange 34 of the base. Suitable balls 37 ride in the ball race, whereby the globe rotates about the base, being driven by the drive gear 29 engaging with the ring gear 30. A supporting bracket 38 extends inwardly to a central aperture 39 formed interiorly of the base of the globe, and carries a shaft 40, upon which is mounted a pinion gear 41 engageable with the drive gear 29. The shaft 40 serves to operate a compressor pump 42, which is connected with a compressed air container 43, the latter having a suitable control valve 44 adapted to be adjusted by means of an externally extending control knob 45. An inlet tube 46 extends to the tank 43, and is adapted to have compressed air forced thereinto through an inlet 47. A safety pressure valve 48 extends exteriorly of the base 20. The base 20 is open at the top, but is provided with a bottom 49, which serves as a seat for the motor 24 and the compressed air tank 43.

From the bottom 49 a supporting plate 50 extends upwardly past the center of the globe, through the opening 39 in the bottom thereof, and terminates in a bracket 51, which carries a fixed disk 52. The fixed disk 52 has a central bushing 53, through which extends a threaded fitting 54, which forms the inner surface of a ball race comprised of balls 55, the outer surface 56 of which ball race forms a part of a rotatable disk 57. The fixed disk 52 carries at one point a brush 58, and interiorly thereof a conductive ring 59, while the outer rotatable disk carries a conductive ring 60 and one or more conductive brushes 61, to provide a continuous flow of electrical current from the stationary disk to the fixed disk, when such current is supplied in a manner to be more fully described hereinafter.

The rotatable disk 57 carries a ring gear 62, which is adapted to be engaged by a beveled gear 63 carried at the upper extremity of the shaft 28, and rotatable synchronously with the gear 29. The supporting bracket 64 serves to support the upper end of the shaft 28, and the bracket 64 carries a socket 65, which contains an illuminating bulb 66 for the purpose of supplying interior illumination to the globe.

A tubular connection 67 extends between the valve 44 and the fitting 54, for the purpose of supplying air through the fitting 54, to a tubular member 70, which in turn supplies air through a rotatable fitting 71, secured in sealed relation as by means of a gasket 72 or the like for rotation about the fitting 70. A duct 73 extends from the fitting 71 upwardly radially of the rotatable wheel 57 and is secured to a housing 75, which contains, as best shown in Figure 8 a solenoid coil 76, which is provided with a solenoid core 77 (see Fig. 9). The coil 76 is contained in an inner housing 78, leaving space passageways about the periphery thereof between the housing 78 and the interior of the housing 75. A bushing 79 in the lower tapered extremity 80 of housing 75 permits the admission of wires 81 associated with contacts 82 on the solenoid, the wires 81 being supplied with current in a manner to be more fully described hereinafter. The upper surface 83 of the housing is rounded at the corners, and conforms closely to the interior configuration of the globe 20. It may be here pointed out that the globe 20 is provided over its entire extent with a series of closely spaced apertures 85, the purpose of which will be more fully described hereinafter. An arm 86 is secured by rivets 87 at one end to the housing 75, and at its other end is suitably fixed to the outer end of the rotating disk 57. A second arm 88 is diametrically opposed to the arm 86, at the opposite side of rotatable disk 57, and carries a counter weight 89, for the purpose of counter balancing the solenoid housing 75 and its associated mechanism.

As best shown in Figure 6, the stationary disk or ring 52 carries a plurality of rollers or bearings 90, at suitable points about the periphery thereof, adapted to engage the inner face of the rotatable disk 57.

A slightly modified form of the invention discloses similar bearings 90a in Figure 6a, the construction being substantially identical to that of Figure 6 with the exception of the placement of the bearings as indicated.

Having reference now to Figures 12 and 13, the simulated artificial satellite 23 is comprised of a ball, generally indicated at 95, which is comprised of extremely light material, and which may be either solid, or hollow and air filled. The lower portion of the ball includes a metal cap 96, while a plurality of normally vertically positioned arcuate fins 97 extend peripherally about the satellite 23, and are adapted, when struck by a current of air in a manner to be more fully described hereinafter, to impart rotative movement thereto about its own axis.

A modified form of construction is disclosed in Figure 14, wherein the ball 95a is substantially identical to the ball 95, and includes a metallic cap 96a and a plurality of fins 97a. However in this modification the fins are substantially straight, and provide merely baffles for the deflection and guidance of air, without imparting spin to the simulated artificial satellite.

In Figure 15 there is disclosed schematically a wiring diagram for the device, wherein a positive lead 100 extends from the plug 27 to the filament 101 of the electric bulb 66, from which the negative return 102 extends through a manual switch 103 to the negative wire 106. The positive line 27 extends also from a terminal 107 at its juncture with wire 100 through wire 108 to a terminal 109, from which one lead 110 extends to one pole of motor 24. The other terminal of motor 24 has connected thereto a negative lead 111, which extends through a rheostat 112 back to the negative line 106.

From terminal 109 a wire 113 extends to one terminal of the selenium rectifier 114, from another terminal of which a wire 115 extends to the ring 59. The circuit is established through the ring 59, and brush 61 to one of wires 81 (81a) which extends to the coil 76 of the solenoid previously described. A wire 81b extends from the other terminal of the solenoid coil 76 to ring 60, from whence it is conducted through brush 58 to a wire 116, which extends to a rheostat 117, thence through a wire 118 to still another terminal of the selenium rectifier 114. The negative terminal of the selenium rectifier is connected to a wire 119, which extends back to the negative line 106.

It will thus be seen that when the device is plugged in, the motor 24 will be energized, as will the solenoid 76. The energization of the motor 24 will in turn drive shaft 28, and correspondingly gears 29 and 63. The ratio of the gears 29 to 63 may be in any desired amount, the preferred arrangement being such that the globe 20 will revolve once to twelve complete orbital rotations of the satellite 23. Simultaneously the current is converted to direct current through the selenium rectifier 114, and conducted through rings 59 and 60 and brushes 58 and 61 to energize the solenoid coil 76. The attraction of the solenoid coil causes attraction of the metallic under portion 96 of simulated satellite 23, serving to attract toward the surface of the globe 20. Simultaneously the gear 29 drives pinion 41, which actuates pump 42, to force a draft of air through the conduit 67, the fitting 54 and the fitting 70 and 71 through conduit 73 and out through the passage between the housing 75 and the inner housing 78. This flow of air passes through the apertures 85 immediately adjacent to the mouth 83 of the solenoid housing, and serves to repel the satellite 23, thus maintaining the satellite a spaced distance above the surface of the globe, with no apparent connection therewith. The flow of air also imparts rotation to the device by its impact against the blade 97.

From the foregoing it will now be seen that there is herein provided an improved device of this character, wherein a satellite spaced from a rotating globe is adapted to rotate in a continuous orbit about the globe, with no apparent means of connection to the globe, and at any desired ratio of speed of orbiting relative to the speed of revolution of the globe. By virtue of the distribution of the holes 85 throughout the entire surface of the globe, the satellite will retain its orbit regardless of the relative rotative position of the globe with respect thereto.

From the foregoing it will now be seen that there is herein provided an improved simulated orbiting satellite, which approximates realistically the actual orbiting of a satellite about the earth, and which accomplishes all of the objects of this invention, including many advantages of great practical utility and high educational and amusement value.

As many embodiments may be made of this inventive concept, and as many modifications may be made in the embodiment hereinbefore shown and described, it is to be understood that all matter herein is to be interpreted merely as illustrative and not in a limiting sense.

What is claimed is:

1. In a simulated orbiting artificial satellite the combination of a base, a globe mounted for rotation about a vertical axis on said base, means in said base for rotating said globe, an artificial satellite rotatable about said globe in a predetermined orbit on an axis angularly disposed relative to said vertical axis, means in said globe for rotating said satellite, an electric motor and a compressed air supply in said base, connected gears driven by said motor for rotating said globe, a rotatable disk in said base angularly disposed relative to the axis of rotation of said globe, gearing between said disk and said motor for rotating said disk, a solenoid carried by said disk adjacent to the periphery of said globe, energization of said solenoid attracting said satellite towards said globe, the surface of said globe having a plurality of closely spaced apertures therein, an air passage surrounding said solenoid, and a connection between said air passage and said compressed air supply whereby air passing through said aperture repels said satellite from contact with said globe.

2. The structure of claim 1 wherein said satellite is provided with arcuate vanes whereby said air current rotates said satellite about its own axis.

3. The structure of claim 1 wherein said globe is of translucent material, and a source of illumination is poitioned therein.

4. The structure of claim 1 wherein said compressed air supply includes a tank of compressed air and a pump driven by said motor.

5. The structure of claim 1 wherein said rotatable disk carries a counterweight diametrically opposite said solenoid.

6. The structure of claim 1 wherein an electric current is provided for said motor and said solenoid, and a rheostat is positioned in said circuit for controlling the speed of said motor.

References Cited in the file of this patent

UNITED STATES PATENTS

| 465,824 | Moore | Dec. 22, 1891 |
| 1,453,755 | Craver | May 1, 1923 |
| 2,000,457 | Schulse | May 7, 1935 |
| 2,055,498 | Jacobs | Sept. 29, 1936 |
| 2,763,183 | Liversidge | Sept. 18, 1956 |

FOREIGN PATENTS

| 889,257 | Germany | Sept. 10, 1953 |